United States Patent

Hettlage

[11] Patent Number: 5,243,187
[45] Date of Patent: Sep. 7, 1993

[54] HIGH RESOLUTION ABSOLUTE ENCODER FOR POSITION MEASUREMENT

[75] Inventor: Eckart Hettlage, Karlsruhe, Fed. Rep. of Germany

[73] Assignee: Teldix GmbH, Heidelberg, Fed. Rep. of Germany

[21] Appl. No.: 778,928

[22] PCT Filed: Jun. 28, 1990

[86] PCT No.: PCT/EP90/01033
§ 371 Date: Dec. 13, 1991
§ 102(e) Date: Dec. 13, 1991

[87] PCT Pub. No.: WO91/00498
PCT Pub. Date: Jan. 10, 1991

[30] Foreign Application Priority Data

Jul. 1, 1989 [DE] Fed. Rep. of Germany ....... 3921756

[51] Int. Cl.$^5$ .............................................. G01D 5/34
[52] U.S. Cl. .................................... 250/231.16; 341/13
[58] Field of Search ...................... 250/231.16, 231.18, 250/237 G, 231.13; 341/13; 356/373-375

[56] References Cited

U.S. PATENT DOCUMENTS

| 4,500,870 | 2/1985 | Krohn et al. | 250/231.13 |
| 4,623,328 | 11/1986 | Hartranft | 250/231.16 |
| 4,746,791 | 5/1988 | Forkel | 250/231.13 |
| 4,803,425 | 2/1989 | Swanberg | 324/173 |
| 4,806,751 | 2/1989 | Abe et al. | 250/231.13 |
| 4,851,835 | 7/1989 | Krumholz et al. | 340/870.37 |
| 4,882,479 | 11/1989 | Hino et al. | . |
| 4,948,968 | 8/1990 | Matsui | 250/237 G |
| 4,950,891 | 8/1990 | Matsui | 250/231.18 |
| 4,956,553 | 9/1990 | Matsui | 250/231.18 |
| 5,017,776 | 5/1991 | Loewen | 250/231.16 |

FOREIGN PATENT DOCUMENTS

| 0258725 | 3/1988 | European Pat. Off. . |
| 0304893 | 3/1989 | European Pat. Off. . |
| 2057459 | 7/1972 | Fed. Rep. of Germany . |
| 2847522 | 5/1980 | Fed. Rep. of Germany . |
| 3201811 | 9/1983 | Fed. Rep. of Germany . |
| 8910832 | 12/1989 | Fed. Rep. of Germany . |
| 2210525 | 6/1989 | United Kingdom . |

Primary Examiner—David C. Nelms
Assistant Examiner—S. Allen
Attorney, Agent, or Firm—Spencer, Frank & Schneider

[57] ABSTRACT

An encoder comprises a rotatable or longitudinally displaceable body having a plurality of sawtooth-shaped regions which lie one behind the other in the direction of rotation or displacement. Each sawtooth-shaped region is separated by a steep edge that extends transversely to the direction of rotation or displacement. Upon movement of the body due to its sawtooth-shaped configuration, the distance of the surface of the sawtooth-shaped regions changes relative to a distance sensor arrangement. An evaluation circuit receives the output signals of the sensor arrangement and determines the rotation angle or the displacement of the body. The sensor arrangement comprises two distance sensors being offset relative to one another in the direction of movement by less than one sawtooth-shaped region forming distance signals, with the distance signals input to the evaluation circuit. The evaluation circuit evaluates only one of the distance signals in order to determine the angle or displacement of the body. The entire surface of the rotationally or longitudinally displaceable body facing the distance sensors has coinciding sawtooth-shaped regions. A rough measuring system is provided whose signals are fed to the evaluation circuit to characterize the individual sawtooth-shaped regions. An offset signal which characterizes the rotation angle or the displacement is associated with the individual sawtoothshaped regions in the evaluation circuit. The absolute rotation angle or displacement signal is formed in the evaluation circuit from the applicable offset signal and the signal of the presently employed distance sensor.

8 Claims, 6 Drawing Sheets

FIG. 8
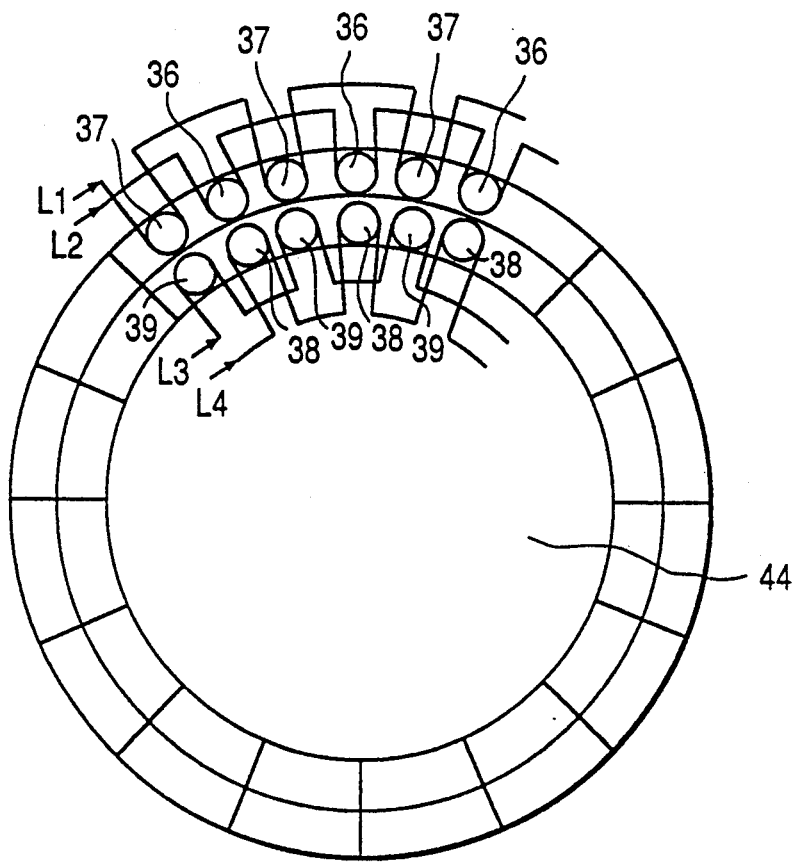
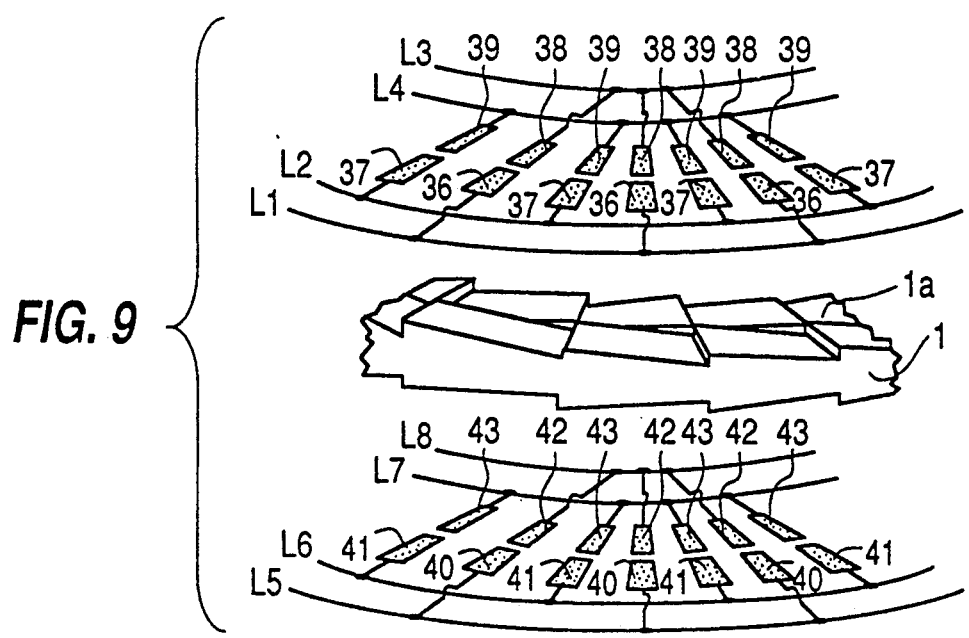
FIG. 9

HIGH RESOLUTION ABSOLUTE ENCODER FOR POSITION MEASUREMENT

BACKGROUND OF THE INVENTION

1. Field of the Invention

The invention relates to a high resolution absolute encoder. for transducing mechanical movements into electrical signals for determining position.

2. Description of the Related Art

DE-OS [German Unexamined Published Patent Application] 3,833,115 discloses an optical coder for position measurements in connection with machine tools. This coder includes a light source for emitting coherent, parallel light, a scale provided with grating track having uniform grating constants but a varying ratio of light blocking to light transmitting sections for diffracting the light coming from the light source, and a photoelectric transducer device for receiving a plurality of diffracted light beams of different orders originating from the light beams generated by diffraction in the scale and converts them to electrical signals according to their intensity. The coder further includes a reading device which determines the relationships between the electrical signals emitted by the photoelectric transducer unit on the basis of the patterns of the grating track which change as a result of the relative movement between the scale, on the one hand, and light source and photoelectric transducer unit, on the other hand, and converts these relationships with the aid of a converter device for output as position data for the scale.

EP 0,258,725.A2 further discloses a capacitive linear motion or shaft encoder for controlling and positioning moving objects. In its configuration as shaft encoder, the device is composed of two oppositely disposed spaced stators with a rotor being rotatably arranged in the space therebetween. The rotor is connected so as to rotate together with a shaft that is coupled with the moving object.

Electrically conductive coatings are disposed on the mutually facing sides of the stators and the rotor, so as to form capacitors with the air gap of a capacitance value that changes with the rotation of the rotor.

To realize accuracy and resolution, the coatings are arranged on the rotor and the stators in such a manner that at least two circular ring shaped concentric regions result of which the one region forms the measuring track for a rough measuring system and the other region forms the measuring track for a precision measuring system. The digitally detected values from the rough measuring system are combined with the values of the precision measuring system so that an unequivocally defined absolute value results for the angle of rotation. This is accomplished in that coupling capacitances generated by mutually associated coatings of rotor and stators have a curve shape over the rotation of the shaft which is sinusoidal in sections. The addition of a plurality of mutually displaced capacitance curves having different signs and being sinusoidal in sections results in an approximately purely sinusoidal capacitance curve having a period duration which is a function of the number of measuring tracks.

It has been found that components such as light sources exhibit flows and perform unreliably, particularly under difficult environmental conditions. For example, several observation satellites have become useless due to the failure of the angle encoders in their scanning mechanisms. Most frequently, it was the light sources that malfunctioned although they were provided with backups.

Another critical point are the encoder discs. Usually these are composed of glass and their installation is extremely difficult with respect to preventing vibration and accounting for the thermal behavior of the various materials.

SUMMARY OF THE INVENTION

The principle of the high resolution angle or linear encoder according to the invention described hereinafter utilizes the possibility of a precise mechanism in conjunction with high resolution position sensors as well as intelligent signal evaluation and error correction with the aid of a microprocessor. Since inductive or capacitive position sensors, when considered with respect to their reliability, are basically mechanical components, the core of the angle or linear encoder is composed of purely mechanical components. The utilization of differential measuring methods also makes it substantially independent of temperature which permits, for example, its use at very low or very high temperatures.

It is the object of the invention to provide a high resolution absolute encoder which is distinguished by high reliability and vibration resistance as well as a low dependence on temperature variation. This is accomplished by provision of an encoder comprising a rotatable or longitudinally displaceable body having a plurality of sawtooth-shaped regions which lie one behind the other in the direction of rotation or displacement, with each sawtooth-shaped region being separated from the subsequent sawtooth-shaped region by a steep edge that extends transversely to the direction of rotation or displacement and, upon movement of the body due to its sawtooth-shaped configuration, a distance of a surface of the sawtooth-shaped regions changes relative to a distance sensor arrangement. An evaluation circuit which receives the output signals of the distance sensor arrangement and determines therefrom a rotation angle or a displacement of the body, wherein the sensor arrangement comprises two distance sensors which are offset relative to one another in the direction of movement by less than one sawtooth-shaped region in order to form distance signals, with the distance signals being fed to the evaluation circuit and wherein the evaluation circuit evaluates, in each case, only one of the distance signals in order to determine the angle or to determine the displacement of the body. The entire surface of the rotationally or longitudinally displaceable body facing the distance sensors has coinciding sawtooth-shaped regions. A rough measuring system is provided whose signals (not shown) are fed to the evaluation circuit to characterize the individual sawtooth-shaped regions. An offset signal characterizing the rotation angle or the displacement is associated with the individual sawtooth-shaped regions in the evaluation circuit and the absolute rotation angle or displacement signal is formed in the evaluation circuit from the applicable offset signal and the signal of the presently employed distance sensor. Further advantages and embodiments will become evident from the dependent claims and from the description.

Configuration of the Encoder

The encoder is composed of the following component groups:

1. a contoured disc;

2. at least two position sensors for fine resolution;
3. a segment detector; and
4. an electronic evaluation unit.

The operation of the encoder is based on the conversion of a rotational or linear motion into a change in distance which can then be measured by means of differentially connected distance sensors. A certain change in distance then corresponds to a certain change in the angle or path.

High precision distance sensors operate linearly only over a small path range and are able to provide a resolution of about 13 to 14 bits for this section of the path. In order to realize an angle or linear encoder of greater resolution, for example of 18 bits, this maximum change in distance must be associated with a circular segment and this must be repeated from segment to segment.

It is further necessary to be able to distinguish between the individual segments and to be able to detect the beginning and end of each segment with high accuracy and in a reproducible manner. Then, each segment start has a specific associated aperture angle, relative to a zero angle, to which the highly resolved momentary angle of the respective segment is added. Thus it is possible at any time to detect the absolute angle even after a brief failure of the current supply, without returning to the zero point.

BRIEF DESCRIPTION OF THE DRAWINGS

The invention will be described in greater detail with reference to the drawings:

It is shown in:

FIG. 8, a further embodiment of the absolute encoder equipped with position sensors in the form of coils on a printed circuit board;

FIG. 9, the principle of position measurements in the further embodiment;

DESCRIPTION OF THE PREFERRED EMBODIMENTS

Figure 1:
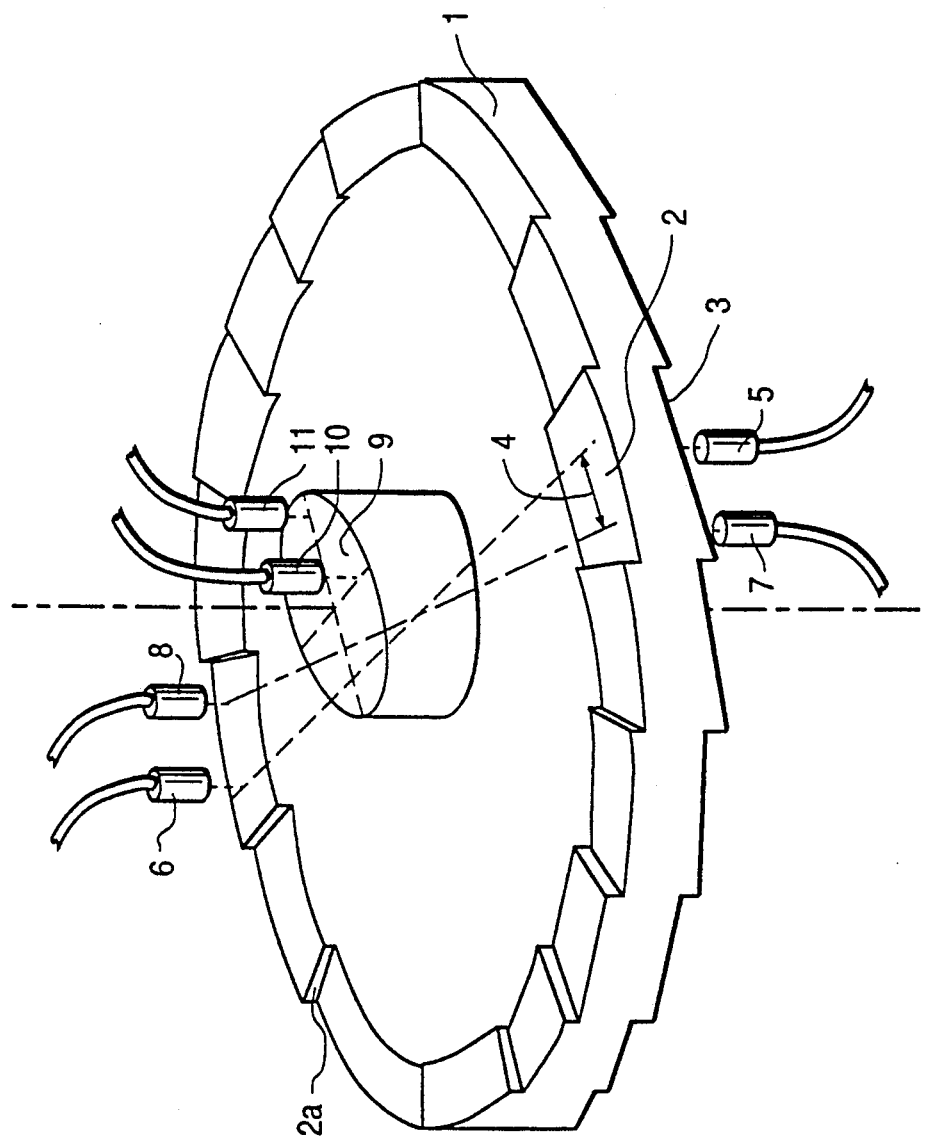
FIG. 1, a perspective view of the basic structure of an encoder according to the invention.
Figure 2:
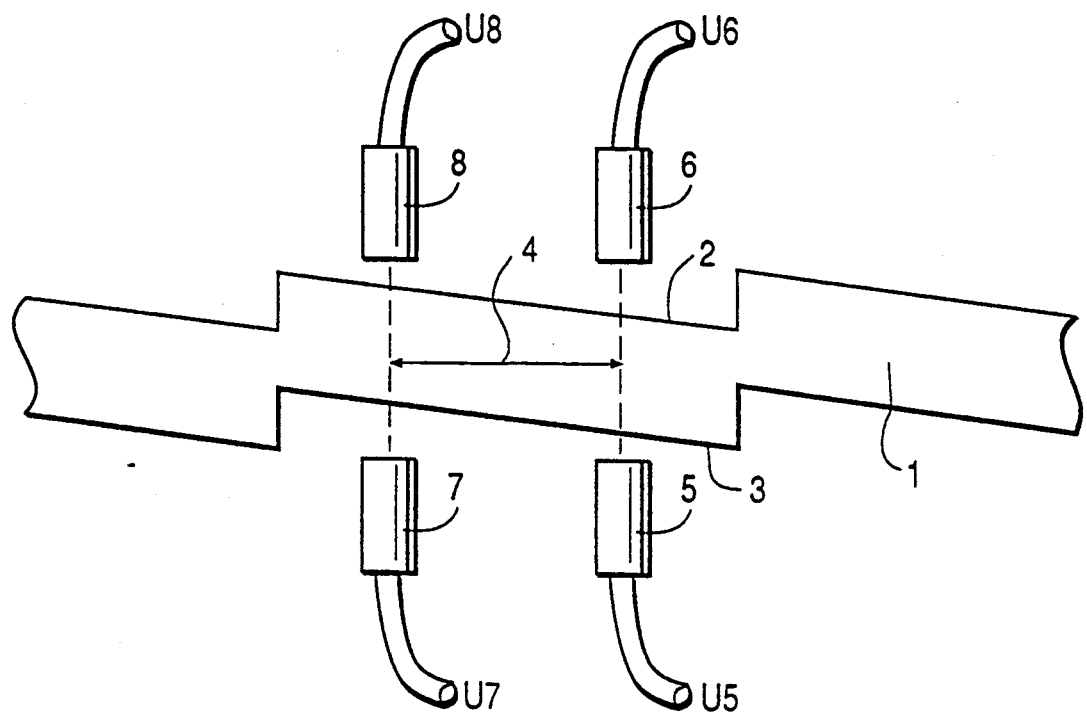
FIG. 2, the segments of the contoured disc in a developed view, with the upper and underside of the contoured disc being offset by 180°.
Figure 5:
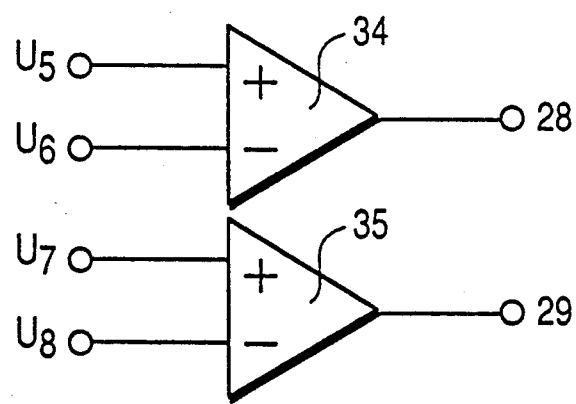
FIG. 5, part of the evaluation circuit.

FIG. 1 shows the basic structure of an angle encoder according to the invention. In another embodiment of the present invention, the encoder may also be configured as a linear encoder. Referring to FIG. 1 there is shown a circular, contoured disc 1 divided. At its outer edge, this disc is provided with sawtooth-shaped contours at its upper face 2 and at its lower face 3, with the length of each sawtooth corresponding to precisely two angle segments 4. Two pairs of sensors 5, 6, and 7, 8, are arranged in such a manner that one sensor 5 or 7 at the lower face is connected with one sensor 6 or 8 at the upper face by way of differential amplifiers 34, 35 (FIG. 5). Additionally, associated sensors are offset by 180° on contoured disc 1. Due to these measures, not only temperature effects but also mechanical effects such as, for example, upward deviations of contoured disc 1 due to non-ideal mounting, are substantially eliminated from the measurement. The pitch of the sawtooth-like contours of contoured disc 1 may be the same on the upper face and on the lower face, as shown in FIG. 1. Or it may be opposite to the other or offset relative to the other. Or, both contour tracks may be disposed on one side. The arrangement of sensors 5, 6, 7, 8 and the shape of contoured disc 1 are again shown in a developed view in FIG. 2. Upper face 2 and lower face 3 of contoured disc 1 are shown offset by 180°.

Figure 3:
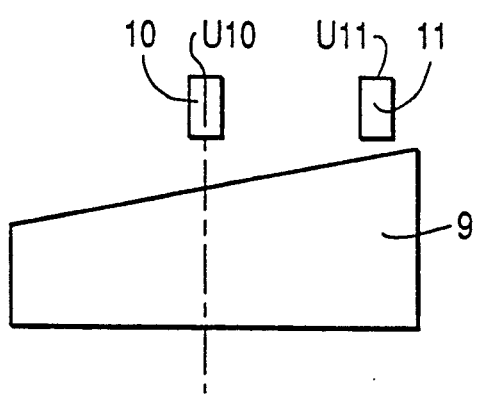
FIG. 3, a side view of a circular zone in the center of the contoured disc provided with two further position sensors.

The arrangement described so far serves to provide fine resolution for individual segments. In order to be able to identify the individual segments and associate them with an offset angle, two further position sensors 10, 11 are necessary. These are offset by 90° and disposed above a circular zone 9 in the center of contoured disc 1. The surface of this disc forms an oblique plane which is wedge-shaped relative to the center plane of the contoured disc. FIG. 3 is a side view of the wedge shape 9 and shows the arrangement of position sensors 10 and 11.

Figure 4:
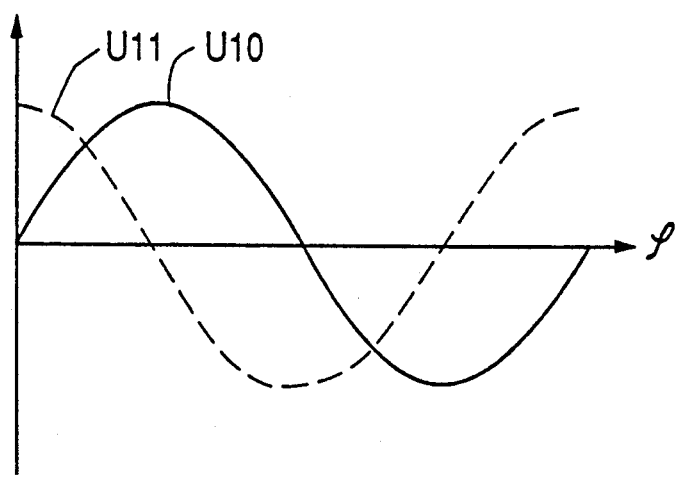
FIG. 4, the function of the output signals of the further position sensors in dependence on the rotation angle $\phi$.

FIG. 4 shows the functions of the sensor signals from sensors 10 and 11. Rotation of contoured disc 1 produces a sine signal 13 and a cosine signal 14, respectively, at the outputs of sensors 10 and 11.

From these, it is possible to perform a rough angle determination for the full circumference. The precision required here is not very high, a resolution of 1/5 segment is sufficient. This results in rough angle zones 20, 21, ..., 27, etc. in FIG. 7, whose beginnings and ends exhibit a certain lack of sharpness. The actual precision of the transitions from segment 15 to segment 16 or from segment 16 to segment 17, etc., is obtained from high resolution signals 28 and 29.

Figure 6:
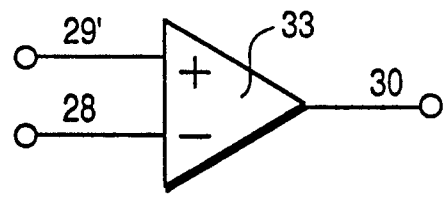
FIG. 6, another part of the evaluation circuit (zone evaluation)

FIGS. 5 and 6 show the evaluation circuit of the encoder. FIG. 5 shows two differential amplifiers 34, 35. The input signals for differential amplifiers 34, 35 are the signals from sensors 5 to 8, with sensor pairs 5, 6 and 7, 8 each being connected with the inputs of one differential amplifier. The electronic unit of the encoder serves the purpose of detecting which segment is momentarily disposed in the linear center operating region of either sensor pair 5, 6 or sensor pair 7, 8 and to utilize it, in dependence on its sensor output signal 28 or 29, for the precision angle measurement. Particularly critical here is the decision in transition region 19 between two respective segments since an unsharpness in this region directly represents the highest realizable angle resolution of the encoder. If initially rough angle zones 20, 21, ..., 27, etc., are considered, it is immediately apparent that, for example, in zone 22 a precision angle signal 28 is being evaluated and its associated offset angle of segment 16, since zone 22 is disposed in the middle of the linear center region of precision angle signal 28. The same applies for zone 26 for which only the offset angle changes corresponding to segment 18.

In contrast thereto, the precision angle signal 29 for zone 20 or 24 and the corresponding offset angles for segments 15 or 17 become effective since the linear central portion of the precision angle signal 29 lies in the region of these zones.

A comparator 33 as shown in FIG. 6 decides whether precision angle signal 28 or 29 is evaluated in zones 21, 23, 25, 27, etc.

The precision angle signal 28 is present at the negative input of comparator 33 and the inverted signal 29' of signal 29 is present at its positive input.

The output of comparator 33 then switches in each case in the middle of segments 15, 16, ... and at segment transitions 19. A signal 30 then appears, whose ends 31 are relatively unsharp and lie in the middle of segments 15, 16, .... These edges 31 are not utilized for evaluation. The edges 32 lie at the respective segment transitions 19. Here the greatest possible steepness is desirable in order to make the region of unsharpness of segment transitions 19 as small as possible.

In the region of zones 21, 23, 25, ..., signal 30 is utilized for a decision as to which precision angle signal 28 or 29' is to be evaluated.

If signal 30 equals 1, signal 29 (29') is employed in zones 21, 23, 25, ..., and, if signal 30 equals 0, signal 28 is utilized. The offset angles are then added correspondingly. For example, in zone 21, the offset angle of segment 15, if signal 30 equals 1, and of segment 16, if signal 30 equals 0.

The entire arrangement can also be employed for linear absolute path measurements over greater regions. Error compensation is then more appropriately effected by an arrangement of the sensors on only one side.

FIG. 8 shows the sensor arrangement of a further embodiment of the absolute encoder in the form of printed coils 36 to 39 which are disposed on a printed circuit board 44. Two of the printed circuit boards shown in FIG. 8 form the sensor unit of the encoder according to the further embodiment. The object of the further embodiment is the replacement of the relatively expensive position sensors of the encoder of FIG. 1 by more economical sensors and at the same time to additionally realize improved error suppression.

For this purpose, coils 36 to 43 which are printed on two printed circuit boards are arranged according to FIGS. 8 and 9. Two sensor coil pairs 36, 38; 40, 42; 37, 39; 41, 43, ... are arranged above each segment of contoured disc 1 on the full circumference of the circle and are connected in parallel or in series in each case.

Coils 36 to 39 are arranged in two circular rings at the outer edge of printed circuit board 44, in each case at one-half the width of a sawtooth. The coils 36; 37; 38; 39 of a circular ring which are spaced from one another at the full width of a sawtooth are each connected in parallel or in series.

This results in a greater inductance that corresponds to the number of segments, thus, firstly, increasing sensitivity and, secondly, forming the integral over all segments on the circumference. This leads to good reproducibility of characteristics 28 and 29 (FIG. 7) from segment to segment. The individual segment angles are here determined by the manufacturing accuracy of the printed circuit boards and no longer by the mechanical contoured disc.

Since the one half of partial coils 36; 37 always experiences exactly the opposite from the other half of partial coils 38, 39, radial deviations or wobble of contoured disc 1 is thus substantially eliminated as well.

FIG. 9 shows coils 36 to 39 arranged on a printed circuit board (not shown) above contoured disc 1 and coils 40 to 43 arranged on a printed circuit board (not shown) underneath contoured disc 1.

With this arrangement of the coils relative to contoured disc 1 it is accomplished that upward deviations of the contoured disc is also compensated and at the same time the sensitivity of the sensor arrangement is augmented.

Figure 7:
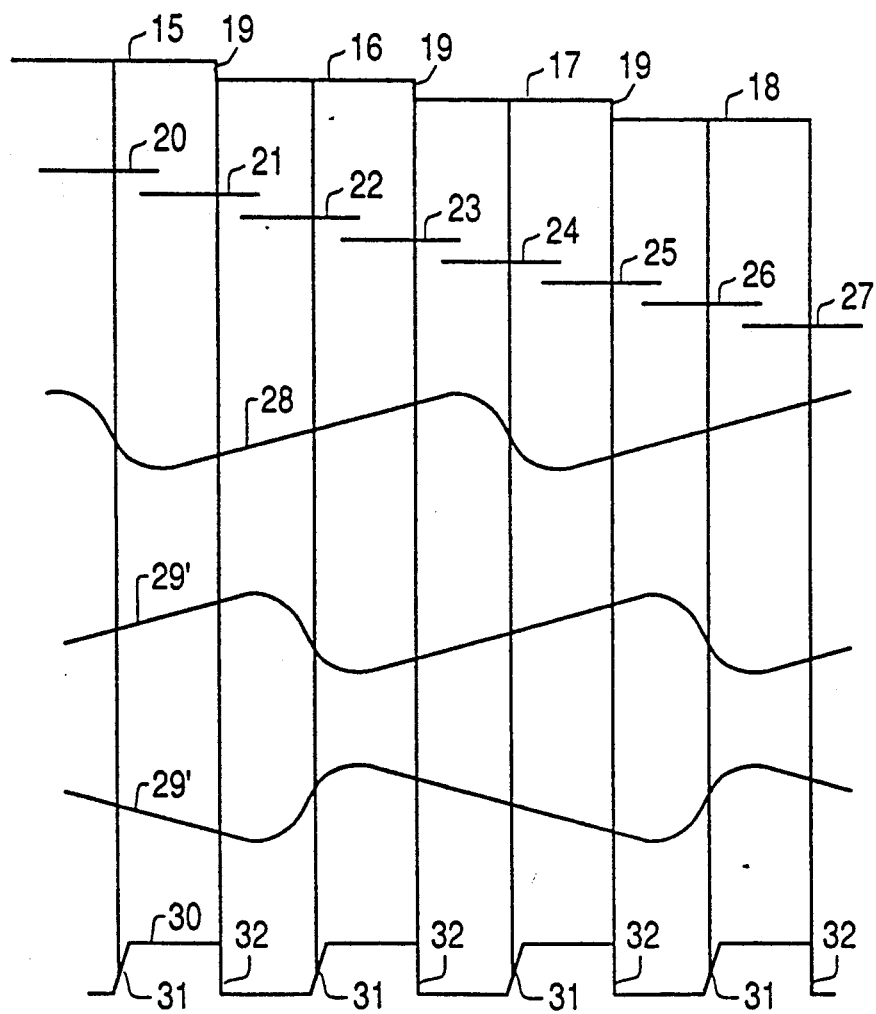
FIG. 7, the sawtooth-shaped elements with the rough angle zones and the signals from the evaluation circuit.
Figure 10B:
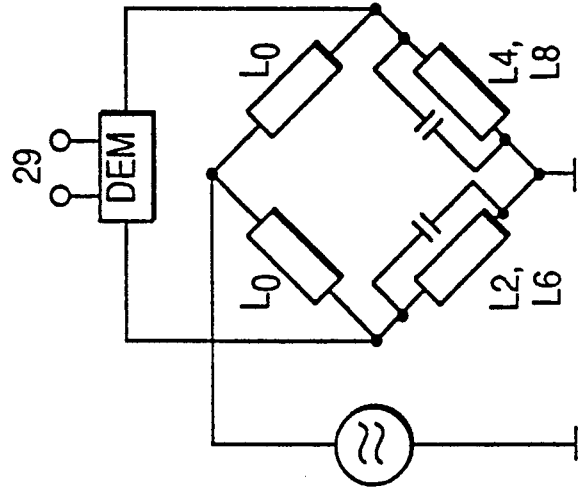
FIG. 10, a possible configuration of the electronic evaluation unit of the further embodiment.

If contoured disc 1 moves, for example, upwardly, the Q factors of inductances L1 to L4 disposed on the upper printed circuit board become poorer but the Q factors of inductances L5 to L8 disposed on the lower printed circuit board become correspondingly better so that the sum of the Q factors of the total inductance remains approximately constant if inductances L1 to L8 are interconnected as shown in FIG. 10. That means, only a rotary movement of contoured disc 1 changes the Q factors of the resonant circuits in FIG. 10 and thus leads to a change in signals 28, 29 (FIG. 7).

This arrangement results in an inexpensive solution which is non-critical with respect to mechanical precision.

FIG. 10 shows a possibility in which the evaluation unit of the encoder according to the further embodiment is a bridge circuit. Coils 36 to 39 of the upper printed circuit board which are each spaced from one another by a segment width, and coils 40 to 43 of the lower printed circuit board opposite them are connected together to form inductances L1 to L8. The series connection of coils 36 results in inductance L1, coils 37 produce inductance L2, coils 38 produce inductance L3, etc.

Figure 10A:
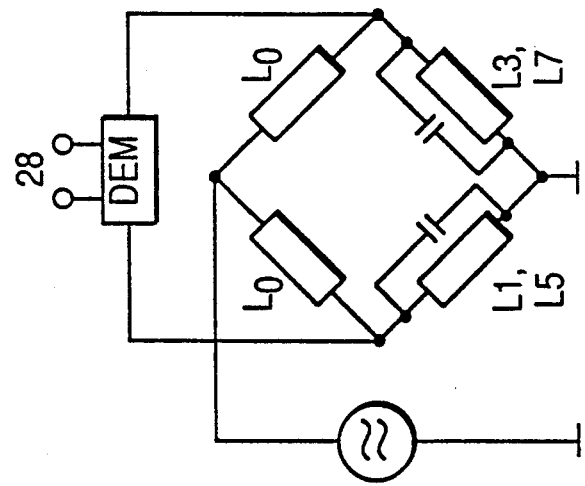

The combined inductances L1 and L5, composed of oppositely disposed coils 36 and 40 of the upper and lower printed circuit board, form one bridge branch (FIG. 10a). The second bridge branch is formed by inductances L3 and L7. The other bridge branches are formed by reference inductances L0. It is assumed that the function of this bridge circuit is generally known. Output signals 28 and 29 correspond to signals 28, 29 of FIG. 7.

I claim:
1. An encoder comprising:
 (a) a rotatable or longitudinally displaceable body having a plurality of sawtooth-shaped regions which lie one behind the other in the direction of rotation or displacement, with each sawtooth-shaped region being separated form the subsequent sawtooth-shaped region by a steep edge that extends transversely to the direction of rotation or displacement and, upon movement of the body due to its sawtooth-shaped configuration, a distance of a surface of the sawtooth-shaped regions changes relative to a distance sensor arrangement;
 (b) an evaluation circuit which receives the output signals of the distance sensor arrangement and determines therefrom a rotation angel or a displacement of the body,
wherein:
 (a) the sensor arrangement comprises two distance sensors which are offset relative to one another in the direction of movement by less than one sawtooth-shaped region in order to form distance signals, with the distance signals being fed to the evaluation circuit and wherein the evaluation circuit evaluates, in each case, only one of the distance signals in order to determine the angle or to determine the displacement of the body;
 (b) the entire surface of the rotationally or longitudinally displaceable body facing the distance sensors has coinciding sawtooth-shaped regions;

(c) a rough measuring system is provided whose signals (not shown) are fed to the evaluation circuit to characterize the individual sawtooth-shaped regions;

(d) an offset signal characterizing the rotation angle or the displacement is associated with the individual sawtoothshaped regions in the evaluation circuit; and (e) an absolute rotation angel or displacement signal is formed in the evaluation circuit from the applicable offset signal and the signal of the presently employed distance sensor.

2. An encoder according to claim 1 wherein the evaluation circuit evaluates in each case only a center section of the sawtooth-shaped regions and the evaluation circuit defines, by way of a defined and reproducible association produced by means of differential amplifiers and a comparator of the edge of the comparator output signals belonging to a certain angle defined by the resolution of the decoder, a precise border between two center sections of the sawtooth-shaped regions so that an absolute angle or an absolute displacement is determined with great precision from the sum of the offset displacements associated with the center sections of the sawtooth-shaped regions and the displacements of the respective center sections measured with high resolution.

3. An encoder according to claim 1, wherein the distance measuring result of the distance sensor disposed opposite a center zone of a region in which the comparator output signal has a less steep edge is utilized in each case for determining the angle or for determining the displacement of the body.

4. An encoder according to claim 3, wherein the phase position of the output signals of a precision measuring system of the distance sensors together with the signal from the rough measuring system are evaluated in order to detect the center zone its precise borders.

5. An encoder according to claim 1, wherein each distance sensor further comprises an associated second distance sensors that is offset in space by 180°; wherein the displaceable or rotatable body further comprises sawtooth-shaped regions which oppose the second distance sensor in the measuring direction in such a way that the distances, which are measured between the surfaces of the sawtooth-shaped regions and the distance sensors, change in opposite direction for each direction of movement and the two mutually 180° offset pairs of distance sensors are each connected by way of a differential amplifier.

6. An encoder according to claim 1, wherein each sawtooth-shaped region further comprises an associated sensor pair at one-half a sawtooth length, with the respective first sensor being connected with the third sensor and the second sensor with the fourth sensor either in series or in parallel.

7. An encoder according to claim 1, wherein the displaceable or rotatable body further comprises a movable body having at least one associated sensor pair.

8. An encoder according to claim 6, wherein the distance sensors are formed by coils that are printed on this plates.

* * * * *